(12) United States Patent
Wang et al.

(10) Patent No.: US 9,676,129 B2
(45) Date of Patent: Jun. 13, 2017

(54) DOUBLE-LAYER INJECTION MOLDING CASING AND METHOD FOR MANUFACTURING THE SAME, ELECTRONIC APPARATUS

(75) Inventors: Dejun Wang, Qingdao (CN); Wangjun Zhang, Qingdao (CN); Haode Jiang, Qingdao (CN)

(73) Assignee: HISENSE HIVIEW TECH CO., LTD., Qingdao, Shandong Province (CN)

( * ) Notice: Subject to any disclaimer, the term of this patent is extended or adjusted under 35 U.S.C. 154(b) by 967 days.

(21) Appl. No.: 13/642,517

(22) PCT Filed: Dec. 23, 2011

(86) PCT No.: PCT/CN2011/084535
§ 371 (c)(1),
(2), (4) Date: Oct. 19, 2012

(87) PCT Pub. No.: WO2012/109943
PCT Pub. Date: Aug. 23, 2012

(65) Prior Publication Data
US 2013/0038992 A1     Feb. 14, 2013

(30) Foreign Application Priority Data

Feb. 15, 2011   (CN) .......................... 2011 1 0038195

(51) Int. Cl.
*B65D 6/14*      (2006.01)
*B29C 45/16*     (2006.01)
(Continued)

(52) U.S. Cl.
CPC .............. *B29C 45/16* (2013.01); *B29C 33/42* (2013.01); *B29C 2045/0093* (2013.01);
(Continued)

(58) Field of Classification Search
CPC ...... H05K 5/0008; H05K 5/0013; H02G 3/14; B29C 45/16; B29C 2045/0093;
(Continued)

(56) References Cited

U.S. PATENT DOCUMENTS 4,499,039 A * 2/1985 Berg ...................... B29C 70/68
156/171
4,712,990 A * 12/1987 Kudert ................ B29C 45/1607
264/255

(Continued)

FOREIGN PATENT DOCUMENTS

CN          101640774 A      2/2010
CN          101666922 A      3/2010
(Continued)

*Primary Examiner* — J. Gregory Pickett
*Assistant Examiner* — Niki M Eloshway
(74) *Attorney, Agent, or Firm* — Cheng-Ju Chiang (57) ABSTRACT

A double-layer injection molding casing and a method for manufacturing the same, an electronic apparatus are provided by this invention, which adapts to an injection molding field and can solve the problems of a conventional double-layer injection molding casing such as complicated manufacturing process and low production efficiency. The double-layer injection molding casing of this invention includes an outer layer and an inner layer. A locating structure integrally formed with the inner layer is located at an inner surface of the inner layer. The method for manufacturing the double-layer injection molding casing includes: applying a multiple injection molding process, wherein the locating structure of the double-layer injection molding casing is integrally formed with the inner layer in the same injection molding step. The electronic apparatus of this invention includes the double-layer injection molding casing. The double-layer injection molding casing can be used as a casing of the electronic apparatus.

13 Claims, 5 Drawing Sheets

(51) Int. Cl.
*B65D 45/02* (2006.01)
*B29C 33/42* (2006.01)
*B29L 31/34* (2006.01)
*B29L 31/44* (2006.01)
*B29C 45/00* (2006.01)

(52) U.S. Cl.
CPC .............. *B29L 2031/3475* (2013.01); *B29L 2031/3481* (2013.01); *B29L 2031/445* (2013.01)

(58) Field of Classification Search
CPC ..... B29L 2031/3475; B29L 2031/3481; B29L 2031/445
USPC ............. 220/4.02, 241, 327, 328, 62.22
See application file for complete search history.

(56) References Cited

U.S. PATENT DOCUMENTS

| | | | | |
|---|---|---|---|---|
| 5,848,718 A * | 12/1998 | Colwell | ................ | H02G 3/081 220/3.94 |
| 6,710,245 B2 * | 3/2004 | Roesch | ................ | H02G 3/105 174/50 |
| 7,525,042 B2 * | 4/2009 | Lazzaro | ................ | H02G 3/086 174/135 |
| 8,152,013 B2 * | 4/2012 | Hendricks | ............ | F24F 13/082 174/562 |
| 8,695,797 B2 * | 4/2014 | Maier | ................ | H05K 5/0013 206/320 |
| 2003/0071007 A1 * | 4/2003 | Ma | ........................ | B29C 43/42 215/252 |
| 2003/0136780 A1 * | 7/2003 | Sato | ........................ | H02G 3/10 220/3.8 |
| 2004/0119390 A1 | 6/2004 | Huang | | |
| 2006/0151505 A1 * | 7/2006 | Kobayashi | ........ | B29C 45/14262 220/562 |
| 2007/0162918 A1 * | 7/2007 | Watanabe | ............ | H05K 5/0013 720/646 |

FOREIGN PATENT DOCUMENTS

| | | |
|---|---|---|
| CN | 101704289 A | 5/2010 |
| CN | 101795845 A | 8/2010 |
| CN | 101902604 A | 12/2010 |
| CN | 102088131 A | 6/2011 |
| CN | 201937997 U | 8/2011 |
| WO | 2008/153336 A2 | 12/2008 |

* cited by examiner

FIG. 8

DOUBLE-LAYER INJECTION MOLDING CASING AND METHOD FOR MANUFACTURING THE SAME, ELECTRONIC APPARATUS

CROSS REFERENCE TO RELATED APPLICATIONS

This application claims the priority benefit of Chinese application no. 201110038195.5, filed on Feb. 15, 2011, titled with "double-layer injection molding casing and method for manufacturing the same". The entirety of the above-mentioned application are hereby incorporated by reference herein and made a part of this specification. The present application is also a 35 U.S.C. §371 National Phase conversion of International (PCT) Patent Application No. PCT/CN2011/084535, filed on Dec. 23, 2011, the disclosure of which is incorporated by reference herein. The PCT International Patent Application was published in Chinese.

FIELD OF THE INVENTION

This invention relates to an injection molding technology field, and particularly to a double-layer injection molding casing and a method for manufacturing the same, and an electronic apparatus.

BACKGROUND OF THE INVENTION

Figure 1:
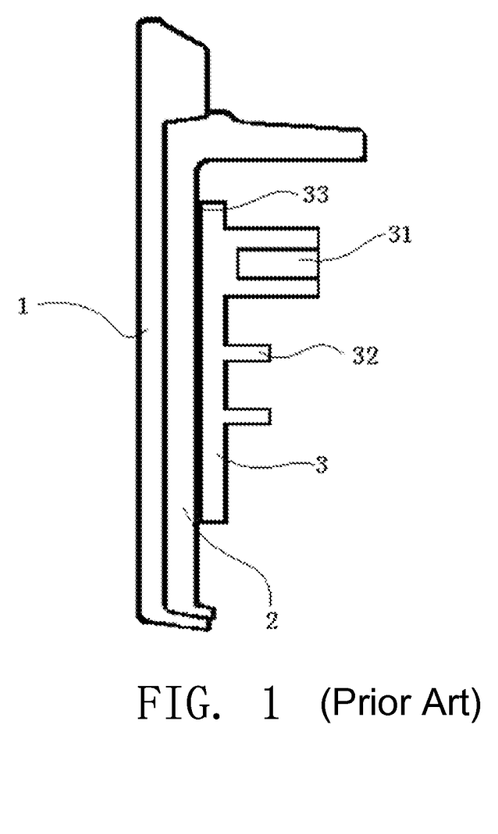
FIG. 1 illustrates a cross-sectional, schematic view of a conventional double-layer injection molding casing.

A double-layer injection molding casing is a kind of multi-component injection (Multi-Component Inject) molding casing, which has been widely used for casings of a variety of electronic apparatuses. Referring to FIG. 1, the double-layer injection molding casing includes an outer layer 1 and the inner layer 2 connected to each other. A component constituting the outer layer 1 and a component constituting the inner layer 2 are usually different (certainly, the outer layer 1 and the inner layer 2 each can be comprised of a variety of different components). Because the component of the outer layer 1 and the component of the inter layer 2 of the double-layer injection molding casing can be different, different portions of the casing can exhibit different properties so as to achieve multiple functions. For example, if the outer layer 1 and the inner layer 2 have different colors (e.g., bi-color injection molding casing), the casing can show different colors in appearance without being dyed. For another example, because an inner side of the casing of the electronic apparatus is used for being contacted with electrical components and an outer side of the casing of the electronic apparatus is used for being contacted with the external environment, it is necessary for the casing to have not only good insulativity and flame retardancy, but also good stain resistance and abrasion resistance. However, a material with such properties has a high cost. If the double-layer injection molding casing is used, so long as the inner layer 2 of the casing is made of a component with good insulativity and flame retardancy and the outer layer 1 of the casing is made of a component with good stain resistance and abrasion resistance, the casing can meet the performance demand of the casing of the electronic apparatus, thereby reducing the cost.

The double-layer injection molding casing is usually manufactured by using a multiple injection molding process (here for example, two injection molding process): at first, the outer layer 1 is formed by injection molding; before the outer layer 1 is entirely solidified, a half mould located at an inner side of the outer layer 1 is replaced (at the same time, the outer layer 1 is remained on a half mould located at an outer side thereof). Then, the inner layer 2 is formed by injection molding. During injection molding the inner layer 2, the outside layer 1 is actually used as a part of a mould cavity. After demoulding, the outer layer 1 and the inner layer are connected together automatically.

It is necessary to dispose a locating structure 3 comprised of a screw post 31 and a structure rib 32 on the inner side of the injection molding casing so as to locate components (e.g., circuit boards, electronic components, etc.) mounted in the injection molding casing, or to combine two parts of the casing together. In the prior art, the double-layer injection molding casing is manufactured by the multiple injection molding process. It is thought that, if the locating structure 3 is directly integrally formed with the inner layer 2 on the inner side of the inner layer 2 by injection molding, the issues such as the decrease of an appearance surface, the difficulty of demoulding the locating structure 3, and so on, will be caused. Thus, in the conventional double-layer injection molding casing, the locating structure 3 is manufactured separately (e.g., injection molding) as a separate part and then is adhered to the inner layer of the casing via a special glue or adhesive tape 33.

It is found by the inventors that the prior art at least has the following problems: since the locating structure of the conventional double-layer injection molding casing is separately manufactured, and the locating structure is adhered to the inner layer of the casing by using the special adhesive tape or glue, the manufacturing process of the conventional double-layer injection molding casing is complicated and has low production efficiency.

SUMMARY OF THE INVENTION

The embodiments of this invention provide a double-layer injection molding casing, which has a simple manufacturing process with high production efficiency.

To achieve the above-mentioned purposes, the embodiments of this invention employ the following technical solution:

A double-layer injection molding casing, includes an inner layer and an outer layer connected to each other. A locating structure integrally formed with the inner layer is located at an inner side of the inner layer.

The double-layer injection molding casing of the embodiments of this invention overcomes the prejudice of the prior art, the locating structure is integrally formed with the inner layer on the inner side of the inner layer without being separately manufactured and being adhered to. Thus, the manufacturing process of the double-layer injection molding casing is simple and has high production efficiency.

As a preferred embodiment of the embodiments of this invention, at a connecting portion of the outer layer and the inner layer, a ratio of an outer layer thickness and an inner layer thickness is in a range from 0.85 to 1.

As a preferred embodiment of the embodiments of this invention, the locating structure includes a structure rib and/or a screw post.

As a preferred embodiment of the embodiments of this invention, the locating structure includes a number of structure ribs, and a ratio of a height and a width of at least one of the structure ribs is either less than or equal to 10.

As a preferred embodiment of the embodiments of this invention, the locating structure includes a number of structure ribs, and at least one of the structure ribs has a recess defined on a side thereof far away from the inner layer.

As a preferred embodiment of the embodiments of this invention, the locating structure includes a number of screw posts, and a ratio of a height and an outside diameter of at least one of the screw posts is either less than or equal to 3.

As a preferred embodiment of the embodiments of this invention, the locating structure includes a number of screw posts, and at least one of the screw posts is connected to the inner layer via a hollow supporting frame.

As a preferred embodiment of the embodiments of this invention, the double-layer injection molding casing is a two-component injection molding casing, the outer layer and the inner layer each are comprised of a component, and the component constituting the outer layer and the component constituting the inner layer are different.

As a preferred embodiment of the embodiments of this invention, the double-layer injection molding casing is a front casing of a display device.

The embodiments of this invention also provide a method for manufacturing the double-layer injection molding casing, which has a simple manufacturing process and has high production efficiency.

To achieve the above-mentioned purposes, the embodiments of this invention employ the following technical solution:

A method for manufacturing the above mentioned double-layer injection molding casing, includes:

applying a multiple injection molding process, wherein the locating structure of the double-layer injection molding casing is integrally formed with the inner layer in the same injection molding step.

In the method for manufacturing the double-layer injection molding casing of the embodiments of this invention, because the locating structure is integrally formed with the inner layer in the same injection molding step, the manufacturing process of the double-layer injection molding casing is simple and has high production efficiency.

The embodiments of this invention also provide an electronic apparatus, which has a simple manufacturing process and has high production efficiency.

To achieve the above-mentioned purposes, the embodiments of this invention employ the following technical solution:

An electronic apparatus, includes a double-layer injection molding casing. The double-layer injection molding casing includes an inner layer and an outer layer connected to each other. A locating structure integrally formed with the inner layer is located at an inner side of the inner layer.

The double-layer injection molding casing of the embodiments of this invention overcomes the prejudice of the prior art, the locating structure is integrally formed with the inner layer on the inner side of the inner layer without being separately manufactured and being adhered to. Thus, the manufacturing process of the double-layer injection molding casing is simple and has high production efficiency.

As a preferred embodiment of the embodiments of this invention, the electronic apparatus is a television or a display, and the double-layer injection molding casing is a front casing of the television or a front casing of the display.

As a preferred embodiment of the embodiments of this invention, at a connecting portion of the outer layer and the inner layer, a ratio of an outer layer thickness and an inner layer thickness is in a range from 0.85 to 1.

As a preferred embodiment of the embodiments of this invention, the locating structure includes a structure rib and/or a screw post.

As a preferred embodiment of the embodiments of this invention, the locating structure includes a number of structure ribs, and a ratio of a height and a width of at least one of the structure ribs is either less than or equal to 10.

As a preferred embodiment of the embodiments of this invention, the locating structure includes a number of structure ribs, and at least one of the structure ribs has a recess defined on a side thereof far away from the inner layer.

As a preferred embodiment of the embodiments of this invention, the locating structure includes a number of screw posts, and a ratio of a height and an outside diameter of at least one of the screw posts is either less than or equal to 3.

As a preferred embodiment of the embodiments of this invention, the locating structure includes a number of screw posts, and at least one of the screw posts is connected to the inner layer via a hollow supporting frame.

BRIEF DESCRIPTION OF THE DRAWINGS

To clearly illustrate the embodiments of this invention or the technology solution of the prior art, the drawings used in the embodiments or the prior art are described simply. Obviously, the following drawings in description are only some embodiments of this invention, and will become more readily apparent to those ordinarily skilled in the art to obtain other drawings according to the drawings.

DETAILED DESCRIPTION OF PREFERRED EMBODIMENTS

The embodiments of this invention will now be described more specifically with reference to the drawings. Apparently, the described embodiments are merely a part of the embodiments of this invention, rather than all embodiments. Based on the embodiments of this invention, it is become more readily apparent to one skilled in the art to devise other embodiments within the scope and spirit of this invention disclosed herein.

The embodiments of this invention provide a double-layer injection molding casing including an inner layer and an outer layer connected to each other. A locating structure integrally formed with the inner layer is located at an inner side of the inner layer.

The double-layer injection molding casing of the embodiments of this invention overcomes the prejudice of the prior art, the locating structure is integrally formed with the inner layer on the inner side of the inner layer without being separately manufactured and being adhered to. Thus, the manufacturing process of the double-layer injection molding casing is simple and has high production efficiency.

Moreover, because the inner layer of the double-layer injection molding casing is generally made of a low surface energy material such as PC, ABS+PMMA, the inner layer is not easy to be bonded. Thus, it is necessary to use a primer so as to improve the adhesion strength. However, the primer may cause a separation of the outer layer and the inner layer. In the present embodiment of the double-layer injection molding casing, it is not necessary to use the primer, thereby avoiding the separation of the outer layer and the inner layer.

Additionally, because the glue or the adhesive tape is used for bonding the locating structure, the conventional double-layer injection molding casing has disadvantages of high cost (especially the cost of the specific adhesive tape), faulty products caused by the bonding process, the pollution of the environment due to the glue, the difficulty of recovery and recycling (because the material of the adhesive tape can not be recycled together with the casing). The double-layer injection molding casing of the present embodiment avoids the above mentioned problems.

Embodiment 1

Figure 2:
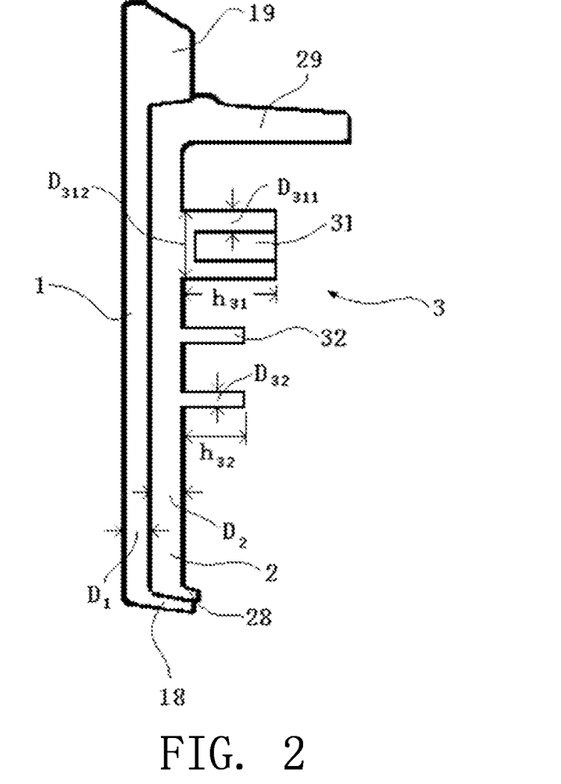
FIG. 2 illustrates a cross-sectional, schematic view of a double-layer injection molding casing in accordance with embodiment one of this invention.

Referring to FIG. 2, the embodiment of this invention provides a double-layer injection molding casing, which includes an outer layer 1 and an inner layer 2. The outer layer 1 and the inner layer 2 are preferably comprised of different components. A component of the outer layer 1 and a component of the inner layer 2 each can be a conventional injection molding material such as PC (polycarbonate), ABS (acrylonitrile-butadiene-styrene copolymer)+PMMA (poly(methylmethacrylate)) alloy material, and so on.

Wherein, an inner side of the inner layer 2 has a locating structure 3 integrally formed with the inner layer 2. That is, the locating structure 3 is integrally formed with the inner layer 2 in the same injection molding step and comprised of the same component. Because the locating structure 3 is integrally formed with the inner layer 2 and the locating structure 3 and the inner layer 2 are directly connected to each other, it is not necessary for the double-layer injection molding casing in this embodiment to manufacture the locating structure separately and to bond the locating structure. Thus, the manufacturing process of the double-layer injection molding casing is simple and has high production efficiency.

Preferably, the double-layer injection molding casing is a two-component injection molding casing, the outer layer 1 and the inner layer each are comprised of a component, and the component constituting the outer layer 1 and the component constituting the inner layer 2 are different. For example, the component constituting the outer layer 1 and the component constituting the inner layer 2 can be components with different colors, and thus the double-layer injection molding casing is a conventional bi-color injection molding casing.

Preferably, the double-layer injection molding casing is a casing of an electronic apparatus, especially, a front casing of a display device such as a television or a display. Certainly, the double-layer injection molding casing can also be a casing of a mobile, a casing of a panel computer, a casing of a telephone, and so on.

Preferably, at a connecting portion of the outer layer 1 and the inner layer 2, a ratio of an outer layer thickness D1 and an inner layer thickness D2 is 0.85~1. Wherein, "the connecting portion of the outer layer 1 and the inner layer 2" refers to a portion where the outer layer 1 and the inner layer 2 exist at the same time along a thickness direction of the casing. A portion shown in FIG. 5 and the like, where the outer layer 1 exists and the inner layer 2 does not exist, is not included in "the connecting portion of the outer layer 1 and the inner layer 2". Further, "the outer layer thickness D1 and the inner layer thickness D2" respectively refer to thicknesses D1, D2 of main portions of the outer layer 1, the inner layer 2 as layer structures. That is, the thicknesses D1, D2 should be own thicknesses D1, D2 of the outer layer 1, the inner layer 2 without considering additional structures disposed on the outer layer 1 and the inner layer 2. Wherein the additional structures includes, but not limited to, structures 18, 28 for preventing the outer layer 1 and the inner layer 2 from laterally sliding, structures 19, 29 for stiffening edges, and the locating structure 3, etc.

After many researches by the inventors, it is found that, on the condition that the total thickness of the double-layer injection molding casing is constant, and the ratio of the outer layer thickness D1 and the inner layer thickness D2 is located in the above mentioned range of 0.85~1, the issues such as decrease in appearance surface (that is, shrinking of the outer surface of the outer layer) during the injection molding process and difficulty in demoulding the locating structure can be effectively avoided. Thus, the double-layer injection molding casing with good quality can be reliably manufactured by a general manufacturing process.

Preferably, the locating structure 3 includes a structure rib 32 and/or a screw post 31. Wherein, the structure rib 32 is configured for seizing up the other components such as printed circuit boards and so on disposed in the double-layer injection molding casing. Meanwhile, the structure rib 32 can be connected to a side portion of the screw post 31 to support the screw post 31. A screw can be screwed into the screw post 31, and thus the other components such as the printed circuit boards can be fixed through the screw, or the double-layer injection molding casing is engaged with the other casing. A double-layer injection molding casing preferably has a number of structure ribs 32 and a number of screw posts 31. The positions and the number can be specifically set according to the demand of the casing. Apparently, the practical casing generally includes a number of structure ribs 32 and a number of screw posts 31, but for convenience, only a small amount of the structure ribs 32 and the screw posts 31 are shown in the drawings.

Preferably, at least one of the structure ribs 32 meets the following dimensional relationship: a ratio of a structure rib height (i.e., a distance between a position of the structure rib 32 far most away from the inner layer 2 and an inner surface of the inner layer 2) $h_{32}$ and a structure rib width (i.e., a dimension of the structure rib 32 along a direction vertical to a longitudinal direction of the structure rib 32 and parallel to the inner surface of the inner layer 2) $D_{32}$ is either less than or equal to 10. Wherein the structure rib width $D_{32}$ can be either less than or equal to 1.2 mm. It is found by the inventors that, on the condition that the structure ribs meet the above mentioned dimensional relationship, it is can be better ensured to demould the structure ribs 32 easily during the injection molding process, thereby avoiding bringing the surface quality problems.

Figure 3:
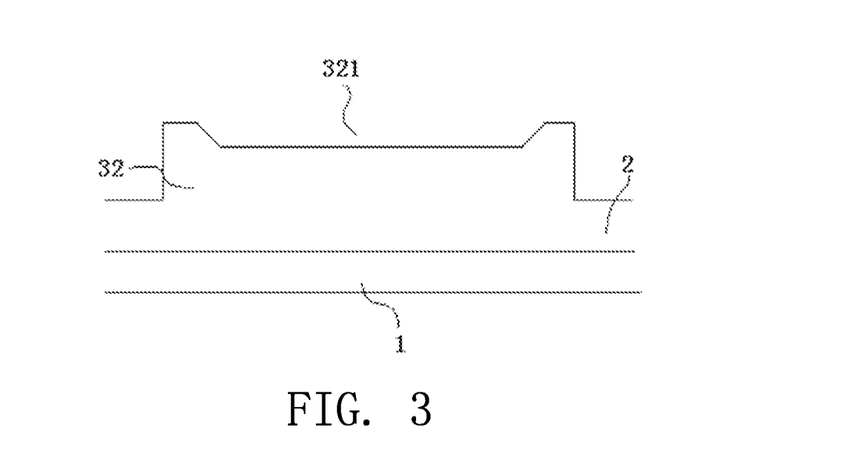
FIG. 3 illustrates a schematic view of a structure rib of a double-layer injection molding casing in accordance with embodiment one of this invention.

Preferably, at least one of the structure ribs 32, referring to FIG. 3, has a recess 321 defined on a side thereof far away from the inner layer 2 (one recess 321 is as an example to be shown in the FIG, but it is noted that a number of recesses can also be defined if the structure rib is long). The specific configuration of the recess 321 is not limited. For such structural rib 32, a side area of the structure rib 32 can be reduced on the condition that the structure rib height h32 is unchanged, thereby demoulding the structure rib 32 easily.

Apparently, as a preferable embodiment, any of the structure ribs 32 of the double-layer injection molding casing should be meet one of the above mentioned two configurations of the structure ribs 32 (or meet both of the two configurations at the same time) so as to ensure that all the structure ribs 32 can demould smoothly. In detail, the structure ribs 32 can be firstly designed as far as possible to meet the dimensional proportion relationship. When the dimensional proportion relationship can not be met (e.g., the structure rib height h32 must be a specific value), the structure rib with the recess 321 can be used.

Preferably, at least one of the screw posts 31 meets the following dimensional relationship: a ratio of a screw post height (i.e., a distance between a position of the screw post 31 far most away from the inner layer 2 and an inner surface of the inner layer 2) $h_{31}$ and a screw post outside diameter $D_{312}$ is either less than or equal to 3. Wherein a screw post sidewall thickness (i.e., a thickness of a signal sidewall of the screw post) $D_{311}$ can be 1.5~1.8 mm. It is found by the inventors that, on the condition that the screw posts meet the above mentioned dimensional relationship, it is can be better ensured to demould the screw posts 31 easily during the injection molding process, thereby avoiding bringing the surface quality problems.

Figure 4:
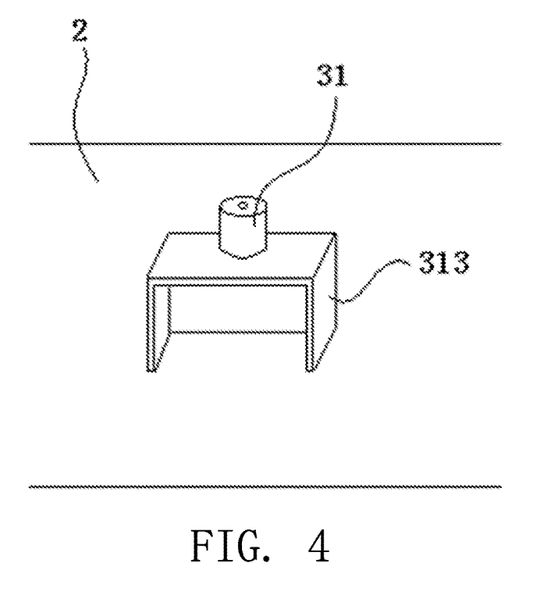
FIG. 4 illustrates a schematic view of a screw post of a double-layer injection molding casing in accordance with embodiment one of this invention.

Preferably, at least one of the screw posts 31, referring to FIG. 4, is connected to the inner layer 2 via a hollow supporting frame 313. The supporting frame 313 can be a hollow cubic, a bottom surface of the cubic is connected to the inner layer 2, a top surface of the cubic is connected to a bottom end of the screw post 31, and a sidewall of the cubic is removed. Certainly, the support frame 313 can also be the other known shapes. In this structure, due to the screw post 31 is in a manner of "floating lower portion", during injection molding, the surface quality problems such as the decrease of the appearance surface will not be raised. Meanwhile, this design reduces an actual length of a body portion of the screw post 31 so that it is easy to demould. Such "floating" screw post 31 can be achieved by a known slanting injection mould (also known as slanted pin injection mould) technology, and thus a specific structure of the screw post are not be described more.

Apparently, as a preferable embodiment, any of the screw posts 31 of the double-layer injection molding casing should be meet one of the above mentioned two configurations of the screw posts 31 (or meet both of the two configurations at the same time) so as to ensure that all the screw posts 31 can demould smoothly. In detail, the screw posts 31 can be firstly designed as far as possible to meet the dimensional proportion relationship. When the dimensional proportion relationship can not be met (e.g., the screw post height $h_{32}$ must be a specific value), the screw post 31 in the "floating" configuration can be used.

Figure 5:
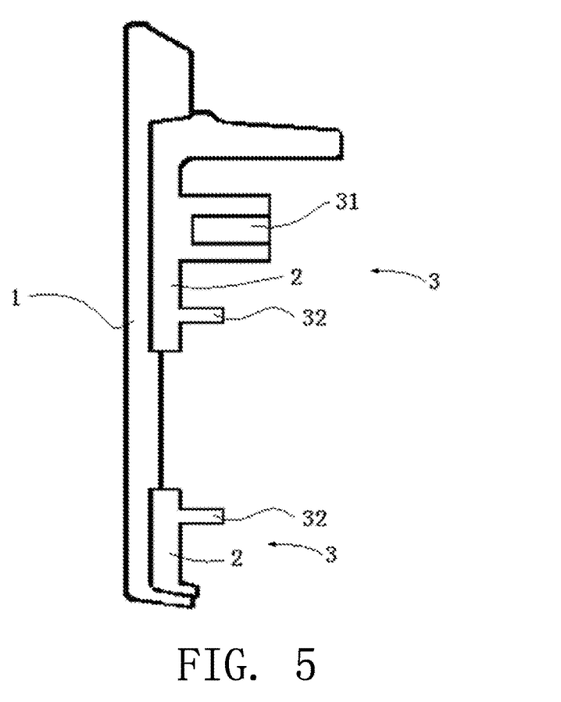
FIG. 5 illustrates a cross-sectional, schematic view of a double-layer injection molding casing in accordance with another embodiment of this invention.

Apparently, the double-layer injection molding casing of this embodiment can have many known variations. For example, as shown in FIG. 5, a casing has a large outer layer 1 and a number of small inner layers 2 separately connected to the outer layer 1. At least one of the inner layers 2 has a locating structure 3 integrally formed therewith. Wherein the inner layers 2 can be comprised of an identical component or different components. Certainly, the double-layer injection molding casing can also has a large inner layer 2 and a number of small outer layers 1 connected to the inner layer 2. Or, the locating structure can also include other conventional locating elements.

The embodiments of this invention provide a method for manufacturing the above mentioned double-layer injection molding casing, which includes:

applying a multiple injection molding process, wherein the locating structure of the double-layer injection molding casing is integrally formed with the inner layer in the same injection molding step.

Figure 6:
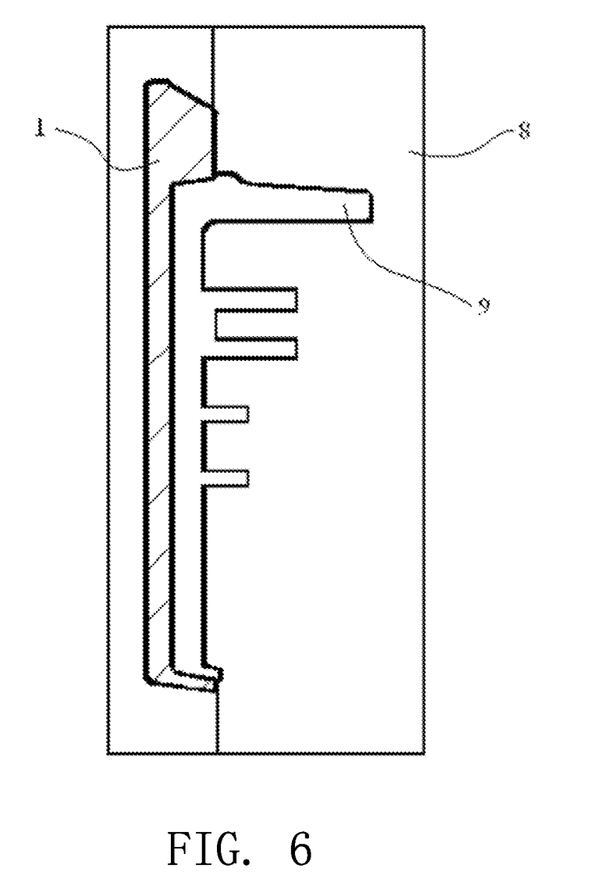
FIG. 6 illustrates a schematic view of a mould used in a method for manufacturing a double-layer injection molding casing in accordance with an embodiment of this invention before injection molding an inner layer.

"The multiple injection molding process" refers to: performing an injection molding step by using a mould to form a first layer (the inner layer or the outer layer) of the double-layer injection molding casing; then, referring to FIG. 6 (as an example, the first layer is the outer layer 1 in the FIG), replacing a half mould of the mould with a substitute half mould 8; performing another injection molding step to form a second layer (for example, if the first layer is the inner layer, the second layer is outer layer; if the first layer is the outer layer 1, the second layer is the inner layer 2) of the double-layer injection molding casing. During injection molding the second layer, a surface of the first layer 1 is actually cooperated with an inner surface of the substitute half mould 8 to form a mould cavity surface of a mould cavity 9. Thus, after finishing the another injection molding step, the second layer and the first layer are contacted with each other and directly connected to each other, thereby forming an entire double-layer injection molding casing.

In the method for manufacturing the double-layer injection molding casing of the embodiments of this invention, because the locating structure is integrally formed with the inner layer in the same injection molding step, the manufacturing process of the double-layer injection molding casing is simple, has high production efficiency, and can avoid the following problems of the double-layer injection molding casing manufactured by the conventional method such as the separation of the inner layer and the outer layer, high cost, faulty products caused by the bonding process, the pollution of the environment of the glue and the difficulty of recovery and recycling.

Embodiment 2

The embodiment of this invention provides a method for manufacturing the double-layer injection molding casing, which includes the following steps:

S01, the outer layer is formed by a first injection molding step;

S02, before the outer layer is entirely solidified, a half mould at an inner side of the outer layer used in the first injection molding step is replaced by a half mould used in a second injection molding step. At the same time, the outer layer is still remained on a half mould at an outer side of the outer layer;

S03, the second injection molding step is performed to form the inner layer and the locating structure simultaneously, and during the second injection molding step, the outer layer is actually used as a part of a mould cavity;

S04, the double-layer injection molding casing is formed after demoulding. Wherein, if the locating structure has the "floating" screw post, a slanted ejection technology can be used.

Apparently, the multiple injection molding process is a conventional technology. On the condition that the structure of the double-layer injection molding casing (i.e., the locating structure is integrally formed with the inner layer) to be manufactured is known and it is also known that the structure can be manufactured by the multiple injection molding process (i.e., the locating structure and the inner layer can be manufactured in the same injection molding step simultaneously), one ordinary skilled in the art can select suitable casing materials, mould structures, injection molding parameters (e.g., injection molding temperature, injection molding pressure, etc.). Thus, the casing materials, the mould structures, the injection molding parameters are not described here.

Apparently, the method for manufacturing the double-layer injection molding casing of this embodiment can have many known variations. For example, for the casing having a number of separated small inner layers as shown in FIG. 5, the inner layers can be formed in the same injection molding step, or can be formed in multiple injection molding steps (certainly, each of the inner layer and the corresponding locating structure should be formed in the same injection molding step).

The embodiment of this invention provides a front casing of a display device by using the above mentioned method. The front casing is a double-layer injection molding casing including an inner layer and an outer layer connected to each other. A locating structure integrally formed with the inner layer is located at an inner side of the inner layer.

The front casing of a display device of the embodiment of this invention overcomes the prejudice of the prior art, the locating structure is integrally formed with the inner layer on the inner side of the inner layer without being separately manufactured and being adhered to. Thus, the manufacturing process of the double-layer injection molding casing is simple, has high production efficiency, and can avoid the following problems of the double-layer injection molding casing manufactured by the conventional method such as the separation of the inner layer and the outer layer, high cost, faulty products caused by the bonding process, the pollution of the environment of the glue and the difficulty of recovery and recycling.

Embodiment 3

The embodiment of this invention provides an electronic apparatus including a double-layer injection molding casing. Preferably, the electronic apparatus is a television and the double-layer injection molding casing is a front casing of the television. Certainly, the electronic apparatus can be a display, a mobile, a panel computer, a telephone, and so on, and the double-layer injection molding casing is a front casing of the display, a front casing of the mobile, a front casing of the panel computer, a front casing of the telephone, and so on.

Figure 7:
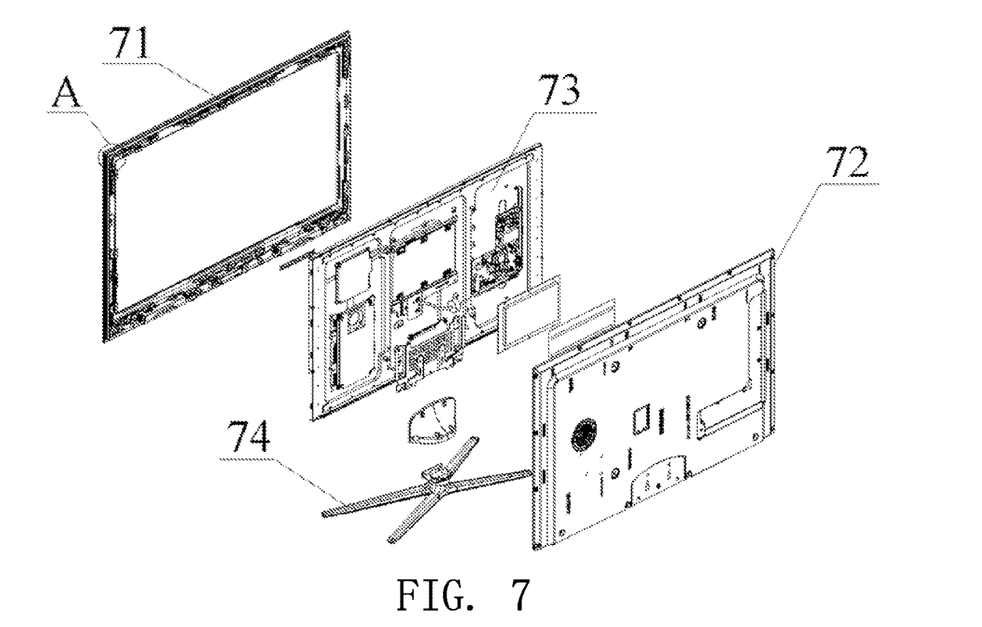
FIG. 7 illustrates an exploded, schematic view of a television in accordance with an embodiment of this invention.

Referring to FIG. 7, the television provided by this embodiment includes a front casing 71, a back casing 72, a display screen 73, a base 74, and so on. Wherein the front casing is a double-layer injection molding casing. Referring FIG. 8 and FIG. 2, the double-layer injection molding casing includes the outer layer 1 and the inner layer 2 connected to each other. The outer layer 1 and the inner layer 2 are preferably comprised of different components. Wherein, a component of the outer layer 1 and a component of the inner layer 2 each can be a conventional injection molding material such as PC, ABS+PMMA alloy material, and so on.

Figure 8:
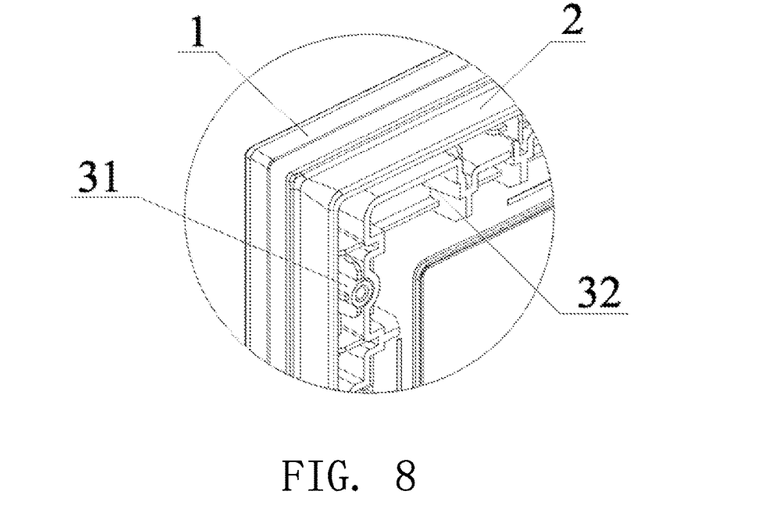
FIG. 8 illustrates an enlarged partial view of A portion shown in FIG. 7.

Wherein, the inner side of the inner layer 2 has the locating structure 3 integrally formed with the inner layer 2. That is, the locating structure 3 is integrally formed with the inner layer 2 in the same injection molding step and comprised of the same component. Because the locating structure 3 is integrally formed with the inner layer 2, and the locating structure 3 and the inner layer 2 are directly connected to each other, it is not necessary for the double-layer injection molding casing to manufacture the locating structure separately and to bond the locating structure. Thus, the manufacturing process of the double-layer injection molding casing is simple, has high production efficiency, and can avoid the following problems of the double-layer injection molding casing manufactured by the conventional method such as the separation of the inner layer and the outer layer, high cost, faulty products caused by the bonding process, the pollution of the environment of the glue and the difficulty of recovery and recycling.

Preferably, the double-layer injection molding casing is a two-component injection molding casing, the outer layer 1 and the inner layer each are comprised of a component, and the component constituting the outer layer 1 and the component constituting the inner layer 2 are different. For example, the component constituting the outer layer 1 and the component constituting the inner layer 2 can be components with different colors, and thus the double-layer injection molding casing is a conventional bi-color injection molding casing.

Preferably, at a connecting portion of the outer layer 1 and the inner layer 2, a ratio of an outer layer thickness D1 and an inner layer thickness D2 is 0.85~1. Certainly, the thicknesses D1, D2 should be own thicknesses D1, D2 of the outer layer 1, the inner layer 2 without considering the additional structures disposed on the outer layer 1 and the inner layer 2. Wherein the additional structures includes, but not limited to, the structures 18, 28 for preventing the outer layer 1 and the inner layer 2 from laterally sliding, the structures 19, 29 for stiffening edges, and the locating structure 3, etc.

After many researches by the inventors, it is found that, on the condition that the total thickness of the double-layer injection molding casing is constant, the ratio of the outer layer thickness D1 and the inner layer thickness D2 is located in the above mentioned range of 0.85~1, the issues such as the decrease of the appearance surface and the difficulty of demoulding the locating structure generated in the injection molding process can be avoided. Thus, the double-layer injection molding casing with good quality can be reliably manufactured by the conventional manufacturing process.

Preferably, the locating structure 3 includes a structure rib 32 and/or a screw post 31. Wherein, the structure rib 32 is configured for seizing up the other components such as a display screen, a printed circuit board disposed in the double-layer injection molding casing. Meanwhile, the structure rib 32 can be connected to a side portion of the screw post 31 to support the screw post 31. A screw can be screwed into the screw post 31, and thus the other components such as the printed circuit board can be fixed through the screw, or the double-layer injection molding casing is engaged with the other casing. The double-layer injection molding casing preferably includes a number of structure ribs 32 and a number of screw posts 31. The positions and the number can be specifically set according to the demand of the casing. Apparently, the practical casing generally includes a number of structure ribs 32 and a number of screw posts 31, but for convenience, only a small amount of the structure ribs 32 and the screw post 31 are shown in the drawings.

Preferably, at least one of the structure ribs 32 meets the following dimensional relationship: a ratio of a structure rib height $h_{32}$ and a structure rib width $D_{32}$ is either less than or equal to 10. Wherein the structure rib width $D_{32}$ can be either less than or equal to 1.2 mm. It is found by the inventors that, on the condition that the structure ribs meet the above mentioned dimensional relationship, it is can be better ensured to demould the structure ribs 32 easily during the injection molding process, thereby avoiding bringing the surface quality problems.

Preferably, at least one of the structure ribs 32, referring to FIG. 3, has a recess 321 defined on a side thereof far away from the inner layer 2 (a recess 321 is as an example to be shown in the FIG, but it is noted that a number of recesses can also be defined if the structure rib is long). The specific configuration of the recess 321 is not limited. For such structural ribs 32, the side area of the structure rib 32 can be reduced on the condition that the structure rib height h32 is unchanged. Thus, the structure ribs 32 are easy to demould.

Apparently, as a preferable embodiment, any of the structure ribs 32 of the double-layer injection molding casing should be meet one of the above mentioned two configurations of the structure ribs 32 (or meet both of the two configurations at the same time) so as to ensure that all the structure ribs 32 can demould smoothly. In detail, the structure ribs 32 can be firstly designed as far as possible to meet the dimensional proportion relationship. When the dimensional proportion relationship can not be met (e.g., the structure ribs height $h_{32}$ must be a specific value), the structure rib with the recess 321 can be used.

Preferably, at least one of the screw posts 31 meets the following dimensional relationship: a ratio of a screw post height $h_{31}$ and a screw post outside diameter $D_{312}$ is either less than or equal to 3. Wherein a screw post sidewall thickness $D_{311}$ can be 1.5~1.8 mm. It is found by the inventors that, on the condition that the screw posts meet the above mentioned dimensional relationship, it is can be better ensured to demould the screw posts 31 easily during the injection molding process, thereby avoiding bringing the surface quality problems.

Preferably, at least one of the screw posts 31, referring to FIG. 4, is connected to the inner layer 2 via the hollow supporting frame 313. The supporting frame 313 can be a hollow cubic, a bottom surface of the cubic is connected to the inner layer 2, a top surface of the cubic is connected to a bottom end of the screw post 31, and a side of the cubic is removed. Certainly, the support frame 313 can also be the other known shapes. In this structure, due to the screw post 31 is in a manner of "floating lower portion", during injection molding, the surface quality problems such as the decrease of the appearance surface will not be raised. Meanwhile, this design reduces an actual length of a body portion of the screw post 31 so that it is easy to demould. Such "floating" screws cylinder 31 can be achieved by a known slanting injection mould technology, and thus a specific structure of the screw post are not be described more.

Apparently, as a preferable embodiment, any of the screw posts 31 of the double-layer injection molding casing should be meet one of the above mentioned two configurations of the screw posts 31 (or meet both of the two configurations at the same time) so as to ensure that all the screw posts 31 can demould smoothly. In detail, the screw posts 31 can be firstly designed as far as possible to meet the dimensional proportion relationship. When the dimensional proportion relationship can not be met (e.g., the screw post height $h_{32}$ must be a specific value), the screw posts 31 in the "floating" configuration can be used.

Apparently, the front casing of the television, i.e., the double-layer injection molding casing of the present embodiment can have many known variations. For example, as shown in FIG. 5, a casing has a large outer layer 1 and a number of small inner layers 2 separately connected to the outer layer 1. At least one of the inner layers 2 has a locating structure 3 integrally formed therewith. Wherein the inner layers 2 can be comprised of an identical component or different components. It is noted that, the double-layer injection molding casing can also has a large inner layer 2 and a number of small outer layers 1 connected to the inner layer 2. Or, the locating structure can also include other conventional locating elements.

The embodiment of this invention provides a method for manufacturing the front casing of the television, which includes:

applying a multiple injection molding process, wherein the locating structure of the double-layer injection molding casing is integrally formed with the inner layer in the same injection molding step.

"The multiple injection molding process" refers to: performing an injection molding step by using a mould to form a first layer (the inner layer or the outer layer) of the double-layer injection molding casing; then, referring to FIG. 6 (as an example, the first layer is the outer layer 1 in the FIG), replacing a half mould of the mould with a substitute half mould 8; performing another injection molding step to form a second layer (inner layer) of the double-layer injection molding casing. During injection molding the second layer, a surface of the first layer 1 is actually cooperated with an inner surface of the substitute half mould 8 to form a mould cavity surface of a mould cavity 9. Thus, after finishing the another injection molding step, the second layer and the first layer are contacted with each other and directly connected to each other, thereby forming an entire double-layer injection molding casing.

In the method for manufacturing the front casing of the television of the embodiment of this invention, because the locating structure is integrally formed with the inner layer in the same injection molding step, the manufacturing process of the double-layer injection molding casing is simple, has high production efficiency, and can avoid the following problems of the double-layer injection molding casing manufactured by the conventional method such as the separation of the inner layer and the outer layer, high cost, faulty products caused by the bonding process, the pollution of the environment of the glue and the difficulty of recovery and recycling.

While the invention has been described in terms of what is presently considered to be the most practical and preferred embodiments, it is to be understood that the invention needs not be limited to the disclosed embodiment. On the contrary, it is intended to cover various modifications and similar arrangements included within the spirit and scope of the appended claims which are to be accorded with the broadest interpretation so as to encompass all such modifications and similar structures.

What is claimed is:

1. A double-layer injection molding casing comprising an outer layer and inner layer connected to each other, wherein
   a locating structure integrally formed with the inner layer is located at an inner surface of the inner layer, and a ratio of an outer layer thickness and an inner layer thickness at a connecting portion of the outer layer and the inner layer is in a range from 0.85 to 1 for avoiding shrinking of an outer surface of the outer layer and facilitating demoulding of the locating structure, wherein the locating structure comprises a plurality of screw posts, and a ratio of a height and an outside diameter of at least one of the screw posts is either less than or equal to 3.

2. The double-layer injection molding casing as claimed in claim 1, wherein the locating structure comprises one or more structure ribs and screw posts.

3. The double-layer injection molding casing as claimed in claim 2, wherein the locating structure comprises a plurality of structure ribs, and a ratio of a height and a width of at least one of the structure ribs is either less than or equal to 10.

4. The double-layer injection molding casing as claimed in claim 2, wherein the locating structure comprises a plurality of structure ribs, and at least one of the structure ribs has a recess defined on a side thereof away from the inner layer.

5. The double-layer injection molding casing as claimed in claim 2, wherein the locating structure comprises a plurality of screw posts, and at least one of the screw posts is connected to the inner layer via a hollow supporting frame.

6. The double-layer injection molding casing as claimed in claim 1, wherein the double-layer injection molding casing is a two-component injection molding casing, the outer layer and the inner layer each are comprised of a component, and the component constituting the outer layer and the component constituting the inner layer are different.

7. The double-layer injection molding casing as claimed in claim 1, wherein the double-layer injection molding casing is a front casing of a display device.

8. A method for manufacturing the double-layer injection molding casing of claim 1, wherein the method comprises: applying a multiple injection molding process, wherein the locating structure of the double-layer injection molding casing is integrally formed with the inner layer in the same injection molding step.

9. An electronic apparatus, comprising a double-layer injection molding casing, the double-layer injection molding casing comprising an inner layer and an outer layer connected to each other, wherein a locating structure integrally formed with the inner layer is located at an inner surface of the inner layer, and a ratio of an outer layer thickness and an inner layer thickness at a connecting portion of the outer layer and the inner layer is in a range from 0.85 to 1 for avoiding shrinking of an outer surface of the outer layer and facilitating demoulding of the locating structure, wherein the locating structure comprises a plurality of screw posts, and a ratio of a height and an outside diameter of at least one of the screw posts is either less than or equal to 3.

10. The electronic apparatus as claimed in claim 9, wherein the locating structure comprises one or more structure ribs and screw posts.

11. The electronic apparatus as claimed in claim 10, wherein the locating structure comprises a plurality of structure ribs, and a ratio of a height and a width of at least one of the structure ribs is either less than or equal to 10.

12. The electronic apparatus as claimed in claim 10, wherein the locating structure comprises a plurality of structure ribs, and at least one of the structure ribs has a recess defined on a side thereof away from the inner layer.

13. The electronic apparatus as claimed in claim 10, wherein the locating structure includes a plurality of screw posts, and at least one of the screw posts is connected to the inner layer via a hollow supporting frame.

* * * * *